2,768,152
PROCESS FOR THE PREPARATION OF ORGANO-POLYSILOXANE RESINS

Abraam Gancberg, Forest-Brussels, Belgium

No Drawing. Application May 26, 1951,
Serial No. 228,533

Claims priority, application Belgium May 31, 1950

7 Claims. (Cl. 260—46.5)

It is known that in the organo-polysiloxanes used as resins in heat-hardening varnishes, the ratio of the number of organic radicals to atoms of silicon $$\frac{R}{Si}$$

varies between 1 and 2. It is smaller for the rapidly-polymerising varnishes and greater for the slowly-polymerising varnishes. When the resins are prepared from monomers previously isolated in the technically pure state, this ratio is effected by the mixing of bi- and trifunctional compounds such as $R_2SiCl_2$ and $RSiCl_3$ in suitable proportions, according to the value of the ratio required. It has already been proposed to achieve the ratio $$\frac{R}{Si}$$

starting from a mixture of bi- and tetrafunctional compounds, but for various reasons it is considered that the use of tetrafunctional compounds such as $SiCl_4$ is very limited, not permitting to obtain all the desired ratios without also making use of trifunctional compounds. If the polymerisation of the monomers is effected according to known principles by a condensation by means of a hydrolysis, in which a mixture of, for example, $SiCl_4$ and $R_2SiCl_2$, is used, there are transiently formed hydroxylated compounds which react in part according to the type of reaction allowing the production of Si-O-Si bridges

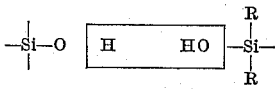

with the formation of water, but at the same time a part of the hydroxylated compounds arising from the $SiCl_4$ precipitates in the form of silica or in the form of siliceous compounds also containing organic radicals. There result material losses as well as a somewhat unforeseeable modification of the ratio $$\frac{R}{Si}$$

in the portion of the compounds which have reacted according to the above-mentioned type of reaction. Experience proves, in addition, that varnishes based on organo-polysiloxanes, obtained from a mixture of di- and tetrafunctional monomers by a process based on the hydrolysis of the starting materials, lose during baking considerable quantities of organo-silicic compounds, which are volatile at the temperature of baking. Taking everything into consideration, it is acertained that for hydrolysis processes the overall yield, calculated on the quantity of organo-silicic compound of the fixed varnish in proportion to the quanatity of monomeric materials, is particularly low when tetrafunctional monomers are used. It is possible to estimate this yield at less than 50%, often scarcely exceeding 40%. In order to avoid these disadvantages, it has been up to the present necessary to make use of trifunctional compounds of the type $RSiCl_3$, and it has been imperative to avoid the use of tetrafunctional compounds in any considerable proportion. In his book "Chemistry of the Silicones" (New York, 1946, page 55), E. G. ROCHOW concludes that only a small fraction of $SiX_4$ can be included in the mixture of intermediate products if it is desired to avoid the precipitation of silica. It would, however, be economically interesting to be able to use in these mixtures an appreciable quantity of tetrafunctional silicon compounds, particularly a tetrahalide or even an alkyl silicate, $Si(OR)_4$, which is obtained from the former by simple reaction with an alcohol. As the bi- and trifunctional monomers are products resulting from comparatively complicated conversions from the silicon tetrahalides, the use of these latter should therefore allow replacement of one of the constituents of the mixtures of monomers by a product taken from an earlier stage of chemical evolution and necessarily being less expensive.

The object of the present invention is to provide a process for obtaining, from mixtures of bi- and tetrafunctional monomers, without appreciable losses in the form of precipitated siliceous compounds, organo-polysiloxanes suitable for the preparation of varnishes adapted to be hardened by heating with a moderate loss of organo-silicic compounds during baking. According to this process, there is submitted to a condensation reaction a mixture containing organo-silicic monomers with two functional groups and a silicon derivative with four functional groups of a different nature, the different functional groups being chosen in such a way that they shall react together and be eliminated in the form of an organic halide during the condensation reaction.

The mixture of monomers therefore contains in principle compounds of the type $R_2Si(OR')_2$ and $SiX_4$ (I) or of the type $R_2SiX_2$ and $Si(OR')_4$ (II), R and R' designating alkyl, aryl, aralkyl or alkylaryl groups and X an atom of halogen.

In these two cases, the tetrafunctional monomer can only condense with the bifunctional monomer and the functional groups are eliminated in the form of R'X. It has, however, been ascertained that it is not in fact necessary to avoid all condensation between the molecules of tetrafunctional compounds and that it is sufficient to prevent the precipitation of silica and a corresponding fall in yield if the compound is previously partially condensed with the molecules of bifunctional compounds. It is therefore possible to stop, by cooling, a condensation commenced according to I, to mix it with another condensation induced according to II, but likewise only partly completed, and to continue the process of condensation by resumption of heating. It has further been ascertained that mixtures of monomers containing simultaneously compounds of the types enumerated above under I and II can be submitted to the condensation reaction with elimination of organic chloride without appreciable quantities of precipitate of siliceous compounds being formed. These different variants of procedure permit the production of organo-polysiloxanes having the ratio $$\frac{R}{Si}$$

desired, as well as the introduction of any desired proportion of different R groups, for example alkyl groups and aryl groups. It is evident that the same result can be attained if the bifunctional monomer or the tetrafunctional monomer is partially replaced by a trifunctional monomer.

In order to carry out the condensation reaction, the mixture of monomers is heated preferably in the presence of a catalyst, for example of a chloride of a trivalent metal or of a mixture of chlorides of several of these metals. It would however be within the scope of the present invention to refrain from the use of a catalyst. The presence of a solvent during the reaction is not in general necessary, but there is nothing to prevent its use in particular cases where it could be of any benefit. Other details of procedure will be apparent from the examples given below.

The use of a silicon tetrahalide for the formation of organo-polysiloxanes by condensation reactions accompanied by evolution of an organic halide has already been previously recommended. But in this case it was a question of making them react with partially hydrolysed, and for this reason already more or less polymerised, derivatives of organosilanes. Neither the possibility of carrying out the reaction exclusively with mixtures of bi- and tetrafunctional monomers isolated in the technically pure state, nor the advantages which then result from the point of view of the qualities of the varnishes obtained and the excellent yield from the starting materials, have by any means been foreseen.

Example 1

A mixture of 51.6 g. of $(CH_3)_2SiCl_2$ and 17 g. of $SiCl_4$ is converted into $(CH_3)_2Si(OC_2H_5)_2$ and $Si(OC_2H_5)_4$ by heating it in the presence of 55.2 g. of ethyl alcohol, and 107.6 g. of $(C_6H_5)_2SiCl_2$ (94% pure) and 17 g. of $SiCl_4$ are added. This reaction mixture has a ratio R/Si=1.6 and contains 20% of the silicon in the tetrafunctional form. A mixture of 0.04 g. of $FeCl_3$ and 4 g. of $AlCl_3$ is added as catalyst and the mixture is slowly heated. The reaction is primed at about 100° C. and some ethyl chloride begins to be evolved. A moderate heating is maintained in order to achieve a smooth elimination of ethyl chloride. After about 4 hours the temperature has reached 150° C. and evolution has ceased. The mixture is cooled and 400 cc. of toluene is added in order to avoid gelling of the reaction product. At this point the $Cl_2$ content is 5% of the quantity originally present. The solution is then slowly poured into iced water to eliminate the remaining chlorine and the catalysts. After filtration and removal of solvent 117 g. of clear, slightly viscous resin is recovered, giving after baking at 250° C., uniform, brilliant, and quite hard coatings.

Example 2

A mixture of 25.5 g. $SiCl_4$, 25.9 g. of $(CH_3)_2Si(OC_2H_5)_2$ and 47.6 g. of $(C_6H_5)_2Si(OC_2H_5)_2$ is prepared, to which is added 0.02 g. of $FeCl_3$ and 2 g. of $AlCl_3$.

Into another flask is introduced 31.2 g. of $Si(OC_2H_5)_4$, 22.6 g. of $(CH_3)_2SiCl_2$, 44.3 g. of $(C_6H_5)_2SiCl_2$, 0.02 g. of $FeCl_3$ and 2 g. of $AlCl_3$.

Taken together, the two mixtures correspond to a ratio R/Si=1.4 and 30% of the silicon is to be found in the tetrafunctional form.

Each of the two mixtures is at first heated slowly until the disappearance of about half the chlorine present. After cooling, the two mixtures are combined, heating is renewed and the elimination of ethyl chloride is resumed at a temperature of about 120° C. After two hours of heating it rises to 152° C. and the evolution of gas strongly diminishes. The mixture is cooled and 400 cc. of toluene are added. The chlorine content is 12% of the initial quantity. About half the solvent is then distilled; the temperature rises to 127° C. After cooling the solvent removed by distillation is replaced and it is ascertained that the chlorine content is now reduced to 2%. After treatment of the product as indicated in Example 1, there is obtained 104 g. of a clear, viscous, yellow resin, giving on dissolution a rapidly-polymerising varnish, which furnishes, after baking in thin coatings, a smooth, hard film.

Example 3

A reaction mixture with a ratio R/Si=1.3 and containing 35% of the silicon in the tetrafunctional form is prepared using 42 g. of $(CH_3)_2SiCl_2$, 87.5 g. of $(C_6H_5)_2SiCl_2$ (94% pure), 72.4 g. of $Si(OC_2H_5)_4$ and 2.1 g. of $SiCl_4$. To this is added 4 g. of $AlCl_3$ and 0.04 g. of $FeCl_3$ and the mixture is slowly heated. Reaction commences at about 100° C. with the evolution of $C_2H_5Cl$. This is maintained at a moderate rate by cutting off the heating and reheating slowly if necessary and after 4 hours the temperature is 96° C. The mixture is cooled and 400 cc. of toluene are added in order to avoid gelling of the reaction product. At this point the chlorine content is 35% of the initial content. 1 g. of anhydrous $FeCl_3$ is then added and the mixture is heated under reflux for three hours. The chlorine content falls to 4%. After treating the product as indicated in Example 1, there is obtained 108 g. of very viscous, slightly turbid resin, which when dissolved as a 25% solution in toluene, gives a very rapidly-polymerising varnish.

For 4 resins, prepared according to the process described, characterised in the following table by the R/Si ratio, there has been determined the content of tetrafunctional silicon in percentages of the total silicon used, the yield based on silicon as well as the loss in organo-silicic compounds during baking of the varnishes and the overall yield of fixed resins, forming film, has been calculated in proportion to the starting materials. On the other hand, there have been prepared two resins, using the same monomers, by a hydrolysis process, and the same determinations have been made. The figures for the overall yield give verification of the superiority of the resins obtained according to the process of the present invention.

| Process— | R/Si | Tetrafunctional Si | Yield in Si | Loss in baking | Overall yield |
|---|---|---|---|---|---|
| | | Percent | Percent | Percent | Percent |
| of the present invention | 1.6 | 20 | 95 | 31 | 66 |
| Do | 1.5 | 25 | 98 | 21 | 77 |
| Do | 1.4 | 30 | 92 | 27 | 67 |
| Do | 1.3 | 35 | ca. 100 | 27 | 73 |
| by hydrolysis | 1.6 | 20 | 83 | 43 | 47 |
| Do | 1.4 | 30 | 60 | 31 | 41 |

I claim:

1. A process for the preparation of heat-hardening organo-polysiloxane resins which comprises, causing a hydrocarbon silicic monomer with two functional groups selected from the group consisting of monomers of the formulae $R_2Si(OR')_2$ and $R_2SiX_2$ wherein R and R' are members of the group consisting of alkyl and aryl radicals and X is a halogen, and a silicon derivative with four functional groups different from said two functional groups selected from the group consisting of compounds of the formulae $SiX_4$ and $Si(OR')_4$ to condense directly inter se in the presence of a condensation catalyst comprising a mixture of aluminum chloride and ferric chloride, the silicon compounds and said catalyst being the sole reactants, the functional groups of one of said monomer and said silicon derivative being halogen atoms attached directly to the silicon atom and the functional groups of the other of said monomer and said silicon derivatives being the radicals —OR' attached directly to the silicon atom, said functional groups being in equimolecular proportions, to form an organic halide, and eliminating said organic halide, whereby to obtain directly the condensation products of said silicic monomer and said silicon derivative.

2. A process as defined in claim 1, wherein said organosilicic monomer has the formula $R_2Si(OR')_2$ and said silicon derivative has the formula $SiX_4$.

3. A process as defined in claim 1, wherein said organosilicic monomer has the formula $R_2SiX_2$ and said silicon derivative has the formula $Si(OR')_4$.

4. A process for the preparation of heat-hardening organo-polysiloxane resins which comprises, heating in the presence of a condensation catalyst comprising a mixture of aluminum chloride and ferric chloride a mixture of monomers of the formulae $R_2Si(OR')_2$ and $SiX_4$, wherein R and R' are members of the group consisting of alkyl and aryl radicals and X is a halogen, said monomers and said catalyst being the sole reactants, to form a partly-condensed product together with R'X, eliminating the R'X thus formed and interrupting said condensation reaction, heating in the presence of a condensation catalyst comprising a mixture of aluminum chloride and ferric chloride a mixture of monomers of the formulae $R_2SiX_2$ and $Si(OR')_4$, said last-named monomers and said catalyst being the sole reactants, thereby forming a partly-condensed product together with R'X, eliminating said R'X and interrupting said second condensation reaction, mixing both of said partly condensed products, continuing the condensation with both of said partly condensed products in the presence of each other and in the presence of said catalyst until no more R'X is formed, eliminating the R'X formed during the last-mentioned condensation, and collecting the final condensation product, said monomers being used in quantities to provide equimolar proportions of the functional groups —X and —OR'.

5. A process for the preparation of heat-hardening organo-polysiloxane resins which comprises, heating a mixture of monomers of the formulae $R_2Si(OR')_2$ and $SiX_4$ and monomers of the formulae $R_2SiX_2$ and $Si(OR')_4$ in the presence of a condensation catalyst comprising a mixture of aluminum chloride and ferric acid and with the reactive groups in said monomers in equimolecular quantities to form a condensation product and R'X, said monomers and said catalyst being the sole reactants, separating said R'X, and collecting the condensation product, R and R' being members of the group consisting of alkyl and aryl radicals and X being halogen.

6. A process for the preparation of heat-hardening organo-polysiloxane resins which comprises, causing ethyl silicate and dimethyl-dichlorosilane to condense directly inter se in the presence of a condensation catalyst comprising a mixture of aluminum chloride and ferric chloride with the reactive groups in said silicate and said silane in molecular proportions to form ethyl chloride and methyl-polysiloxane, the silicon compounds and the catalyst being the sole reactants, separating said ethyl chloride, and collecting said methyl-polysiloxane.

7. A process for the preparation of heat-hardening organo-polysiloxane resins which comprises, causing a hydrocarbon silicic monomer with two like functional groups selected from the group consisting of monomers of the formulae $R_2Si(OR')_2$ and $R_2SiX_2$ wherein R and R' are members of the group consisting of alkyl and aryl radicals and X is a halogen, and a silicon derivative with four like functional groups different from said two functional groups selected from the group consisting of compounds of the formulae $SiX_4$ and $Si(OR')_4$ to condense directly inter se in the presence of a condensation catalyst comprising a mixture of aluminum chloride and ferric chloride, the silicon compounds and said catalyst being the sole reactants, the functional groups of one of said monomer and said silicon derivative being halogen atoms attached directly to the silicon atom and the functional groups of the other of said monomer and said silicon derivatives being the radicals —OR' attached directly to the silicon atom, said functional groups being in equimolecular proportions, to form an organic halide, and eliminating said organic halide, whereby to obtain directly the condensation products of said silicic monomer and said silicon derivative.

References Cited in the file of this patent

UNITED STATES PATENTS

| 2,258,220 | Rochow | Oct. 7, 1941 |
| 2,485,928 | Servais | Oct. 25, 1949 |
| 2,486,162 | Hyde | Oct. 25, 1949 |
| 2,618,646 | Hatcher et al. | Nov. 18, 1952 |

FOREIGN PATENTS

| 496,045 | Belgium | June 15, 1950 |

OTHER REFERENCES

Stokes: American Chemical Journal, vol. 14, 1892, pp. 438 and 446.

Post: Journal of Organic Chemistry, vol. 7, No. 6, 1942, pp. 528, 530–532.

Recueil des Breveto D'Invention, 1947, p. 1357, abstract of Belgian Patent 476,174.

Recueil des Brevets D'Invention, 1948, p. 51, abstract of Belgian Patent 478,117.